United States Patent [19]

Hollaar et al.

[11] 4,450,520

[45] May 22, 1984

[54] METHOD AND SYSTEM FOR MATCHING ENCODED CHARACTERS

[75] Inventors: Lee A. Hollaar, Salt Lake City, Utah; Roger L. Haskin, Los Gatos, Calif.

[73] Assignee: University of Illinois Foundation, Urbana, Ill.

[21] Appl. No.: 242,789

[22] Filed: Mar. 11, 1981

[51] Int. Cl.³ .............................................. G06F 7/22
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,568,156 | 3/1971 | Thompson | 364/200 |
| 3,964,029 | 6/1976 | Babb | 364/900 |
| 4,044,336 | 8/1977 | Babb | 364/900 |
| 4,162,535 | 7/1979 | Anderson | 364/900 |
| 4,241,402 | 12/1980 | Mayper, Jr. et al. | 364/200 |

OTHER PUBLICATIONS

"Text Retrieval Computers", Hollaar, *Computer*, Mar. 1979.
"String Storage ... Kernal", Copeland 1978.
"Hardware Algorithms ... ", Mukhopadhyay, 1978.
"Design of VLSI Chips", Foster et al., Computer, Jan. 1980.
"Sequential Machines ... " Booth John Wiley and Sons, Inc., 1967.
Report R77-002 and R77-008, Bird et al., Operating Systems, Inc., 1977.
"Introduction ... Computation", Hopcraft et al., 1979.
"Algebraic Structure Theory ... ", Hartmenn et al., 1966.
"Hardware for Searching ... ", Haskin, 1980.

*Primary Examiner*—Gareth D. Shaw
*Assistant Examiner*—Daniel K. Dorsey
*Attorney, Agent, or Firm*—Philip Hill; Ronald C. Petri

[57] ABSTRACT

A means and method for comparing an incoming sequential string of digitally encoded characters from a database stored in a conventional memory against a pattern with an arbitrary number of elements, comprising specified characters or character types (alphabetic, numeric, delimiter, etc.) or tokens to indicate the matching of a specified or arbitrary number of input characters, is disclosed. The system comprises a number of digital machines, sequenced by control words fetched from their memories. The control words may indicate the current input character or character type of interest for each machine, the address of the potential next control word of the machine, a flag indicating the successful completion of a match, and other control fields. If the input character matches the character or type of interest, the machine's next control word will be that specified by the current control word, and optionally the next control word of one or more of the other machines will be forced to an address specified in the current control word. By properly specifying the control words in each machine the input character string can be compared against an arbitrary number of pattern elements, limited only by the ability to map the elements into the control word memories of the available machines.

24 Claims, 10 Drawing Figures

START-UP TABLE (ST)

TRANSITION TABLE (TT)

FORK TABLE (FT)

METHOD AND SYSTEM FOR MATCHING ENCODED CHARACTERS

BACKGROUND OF THE INVENTION

This invention relates to data processing systems and, more particularly, to such systems where character are selected by comparing them against specified patterns of characters.

Systems in which a string of input characters from a database stored in some memory device, which may be either fully random access (such as the primary memory of a digital computer system) or serial access (such as a shift register, a magnetic disk memory system, or a bubble memory), is compared against a pattern of search elements specified by a user are becoming common. Examples of these systems include information retrieval systems, database management systems, and pattern recognition systems. Common operations of these systems are to search for the occurrence of all strings of input characters stored in the database which match a given element of the pattern or all locations where two or more elements of the pattern occur within a specified number of characters, words, or within a specified context, such as a paragraph or sentence. In addition to exact character specifications, a given element in the pattern can include special tokens which indicate that any arbitrary character arriving at that time from the database will be accepted at that location within the pattern (called a 'don't-care' token), that a specified number of characters will be accepted (a fixed-length don't-care), or that an arbitrary number of characters, perhaps none, will be accepted (variable-length don't-care). Other special tokens indicate that any character from the database of a specified type (alphabetic, numeric, punctuation, etc.) will be accepted in that location.

In most cases, these systems are implemented as programs on general purpose digital computer systems, with the database being compared against the specified pattern using the standard arithmetic and logical operations of the digital computer. Often, however, the time necessary to execute the required instructions to examine each character in the database is so long that efficient matching is not possible, and more complicated storage indexing methods must be employed. While providing adequate performance, these indexing methods limit searching to information matching the items indexed, such as keywords.

In addition to programs running on conventional digital computer systems, other approaches to matching characters in a database against specified patterns using specialized digital machines or processors have been proposed. These can generally be grouped into two broad classes: associative memory systems, and character recognizers attached to conventional memory systems (such as disk or random access memories).

Associative memory systems employ comparison logic at each location within the memory, each capable of comparing the contents of their particular memory word against a search pattern provided as an input to the associative memory system. Systems employing a number of similar comparators, each programmed to recognize a specified word, can be regarded as a special form of associative memory, which stores the pattern elements in the associative memory and passes the information of the database against them for comparison, rather than storing the database in the associative memory and passing the pattern elements against the database. If the data in an associative memory word and the pattern provided the associative memory compare according to the relationship specified by the system user (generally equality or one larger than the other), the comparison circuitry for that memory location sets a flag bit to indicate the success of the operation. Further matching can be over the entire associative memory or only those words with their flag bits set or cleared. Additional facilities are generally present to allow the matching of specified portions of the words, rather than the whole words, allowing the word to be subdivided into fields of information at fixed locations within the word.

Associative memory systems suffer from three deficiencies which make their use in the retrieval of information based on complex patterns from large databases impractical. First, the cost of each bit of memory is high because each must include complex comparison logic, so that only small associative memories are economically viable. Second, the associative memory cannot efficiently handle variable length don't-care operations within a search pattern, especially when the don't-care is embedded within a word, since the comparisons performed by the associative memory are between corresponding bit positions of the pattern and stored words. Finally, the associative memory can only handle fixed length words, so either a maximum word size must be specified or extra processing is necessary to break long words into sizes matching the selected word length of the associative memory.

The attached character recognizer approach, as discussed by Hollaar in the article "Text Retrieval Computers" in the March 1979 issue of *Computer*, is based on augmenting a conventional memory system, either random access or serial access, with a special match processor which sequentially examines a string of input characters from the database and determines if they match the pattern specified by the user. The simplest implementation is to use a dedicated processor, similar to a conventional general purpose digital computer, to search the database for the patterns. This, of course, suffers from many of the problems of using the host computer system for matching. Generally, this matching consists of comparing characters against one element of the specified pattern until either a match of the element is found or a mismatch of an element's character occurs, at which time another element is searched for, starting at the last position where it was potentially matched. Thompson, in U.S. Pat. No. 3,568,156, has proposed an algorithm which eliminates this need to backtrack to the location of last possible match by effectively comparing all possible pattern elements against the characters from the database at the same time. His technique consists of dynamically creating a list of possible next pattern tokens of interest as comparisons are being done, and then checking them and creating a new list of possible next tokens. This requires a memory device to store the list of next tokens, and the algorithm fails if more next tokens are generated than the memory can accommodate. In contrast, it will be seen that the present invention operates with statically allocated state tables, allowing the potential inability to continue the matching process due to lack of resources to be determined before any matching begins, so that corrective measures can be taken. In addition, the present invention performs all necessary comparisons simultaneoulsy, rather than sequencing through a previously constructed list of tokens, providing a uniform processing time for each character from the database, which can easily be matched to the character delivery rate of the memory system storing the database.

Another means of implementing an attached character recognizer to augment a conventional memory system utilizes a number of cellular comparators, each capable of matching a single token of the pattern such as specified single character or a specific pattern element (such as a don't-care token). This method was separately discussed by Copeland in "String Storage and Searching for Data Base Applications: Implementation of the INDY Backend Kernel," Proceedings of the Third Non-Numeric Workshop, Syracuse, 1978, and Mukhopadhyay in "Hardware Algorithms for Nonnumeric Computation," Proceedings of the Fifth Symposium on Computer Architecture, Palo Alto, 1978. A number of these cellular comparators can be connected to match a multicharacter pattern. For example, if the string DOG is to be matched, three cells would be necessary, one to match each token in the pattern. The cells are connected together serially, with each cell indicating to its successor that a successful match has occured up to that point, and that it should examine the input database character against the token stored in the cell and signal whether the match continues to be successful or not. For more complex patterns, logical elements such as AND or OR gates can be included in the connections between cells. This approach suffers from two problems. The first is that the current character from the database must be broadcast to all cells in the system, requiring excessive line driver requirements. This can be solved by the so-called systolic process suggested by Kung (see "The Design of Special-Purpose VLSI Chips" by Foster and Kung, *Computer*, January 1980), where the characters from the database are shifted through the array of cells serially in one direction, and the pattern being matched possibly being shifted serially in the other direction, eliminating the broadcast requirement but limiting the searching to simple matching of a single pattern. The second difficulty is that, if complex patterns are to be matched, an elaborate connection matrix is required to connect the cells and other logic elements. If this is to be done dynamically in response to a specified set of search pattern elements requiring a large number of cells, the cost and complexity of the connection matrix can easily surpass that of the cells.

A third implementation for an attached character recognizer for a database stored in a conventional memory system is based on a finite state automaton (FSA), such as described generally in *Sequential Machine and Automata Theory* by Booth, published by Wiley in 1978, which is a simple table-driven digital processor. In its most basic implementation, the FSA has an arbitrary number of states, or conditions, based on the history of past input characters, arranged in the form of tables with the table segment for each state having an entry for each character in the FSA's input alphabet which includes the next state for the FSA if that input character is received from the database. The FSA transitions from one state to the next state specified by the state table until a state marked as a match is found, at which time a signal is generated to notify the user of the match condition. The state table can be configured so that all elements of a user-specified pattern are being searched for at the same time. However, in this basic form an extremely large memory is required to hold the necessary state table (if the machine has an input alphabet containing N characters and if M states are necessary, then the resulting memory size will be $N \times M$ words of $\log_2 M$ bits each) even though most entries stored in the state table memory are not of interest and specify a return to the state which begins the match for the start of a pattern element. Storing only the state transitions of interest for each state in a condensed state table memory and searching them to see if one of them or the default transition should occur reduces this memory requirement, at the expense of longer processing time for each character from the database memory. For a database stored on a magnetic disk, which delivers characters at a fixed rate, this may require extensive buffering of the data between the memory and the match machine.

Bird, et al., in Reports R77-002 and R77-008 from Operating Systems, Inc. (21031 Ventura Blvd., Woodland Hills CA 91364) has suggested an approach which recognizes that most states have only one transition of interest, with all other transitions to a default state. These they called "sequential states", and require only the specification of the database character of interest when the FSA is in that state, since the transition will either be to the state stored in the next location in the state table memory or to the default state. A second class of states, called "index states", corresponds to states with transitions to more than one state other than the default state, based on the input character from the database. These require a more complex representation in the state table, indicating where in a table of next state addresses the next state's address is stored. Unfortunately, if any pattern element contains an initial don't-care token, all states must become index states, making the technique simply another implementation of a standard FSA with a fast lookup method for the next state's address.

An alternative to the simple finite state automaton and its various implementations, such as suggested by Bird, is a non-deterministic finite state automaton (NFSA), such as described in *Introduction to Automata Theory, Languages, and Computation* by Hopcroft and Ullman, Addison-Wesley 1979. While a standard FSA can be only in a single state at a given time, an NFSA can be in a number of different states during each time period. Since a standard FSA is simply a special case of the NFSA, with the number of simultaneous states being limited to one, the NFSA is capable of performing any operation which can be performed by the standard FSA, including pattern recognition on characters from a database. The easiest way to produce an NFSA is to replicate a number of standard FSA's, with an idle FSA started every time the possible beginning of a pattern element is recognized. (In the literature of finite state automata, this is sometimes referred to as having the NFSA "make a duplicate copy of itself.") While the required FSA's for this implementation of an NFSA are slightly smaller, since some state transitions occurring when a wrong path is taken when matching a pattern are not necessary, the extra hardware required to dynamically schedule the FSA's would outweigh this difference. Furthermore, either each FSA must have its own copy of the state table in a memory located in it or a memory containing a common copy of the state table must be shared among the various FSA's (requiring a faster memory), each increasing the cost of the NFSA over that of a standard FSA performing the same operations. Because of this, the non-deterministic finite state automaton has remained only a theoretical concept, although the present invention is based on the basic NFSA principle of being in more than one state at a given time.

It is an object of the present invention to provide a system and method which permits the matching of characters from a database stored in a conventional memory system against a pattern whose elements are of arbitrary length. It is a further object of the present invention to provide a method and system which permits the pattern elements to contain tokens which not only specify the exact character encoding to be matched, but also specify arbitrarily defined classes or types of characters acceptable at that location in the pattern. It is a further object of the present invention to provide a method and system which permits the pattern elements to contain tokens specifying that a specified or arbitrary number of characters are acceptable in that location in the pattern.

Additional objects of the present invention are to provide a method and system which avoids the complex sequencing logic required by other FSA-based systems; which avoids the requirements of large state table memories required by other FSA-based systems; which limits the communications and scheduling requirements of the NFSA implemented by using a number of conventional FSA's; which produces a matcher which requires a fixed amount of processing time for each character from the database memory, allowing it to operate synchronized with the database memory system; and which produces a matcher with a regular, memory-based structure and limited connection requirements, permitting implementation techniques such as fabrication as an integrated circuit to be easily employed.

SUMMARY OF THE INVENTION

This invention proposes a new type of finite state automaton, performing all the functions of a standard finite state automaton, but without the difficulties of large state table memories or many state table references per character from the conventional memory system storing the database to be searched. It is based on a division of the conventional state table among two or more similar finite state machines, each capable of communicating with one or more of the other finite state machines. (For the purposes herein, such finite state machines will each be referred to as a "character matcher".) This approach differs from the non-deterministic finite state automata commonly described in the literature, in that each character matcher has only a portion of the state table, rather than each replicated machine having access to a complete copy of the entire state table.

In its broadest aspect, the present invention is a method for detecting matches between strings of input characters and one or more patterns, wherein each pattern is comprised of elements which are in turn comprised of tokens, said method comprising: constructing a state table associated with said pattern which comprises a plurality of states for a plurality of character matchers, wherein each state comprises one token to be compared against said input characters, one or more instructions which govern transitions to one or more next states for one or more character matchers, and one or more instructions to flag a successful match of one or more elements of said pattern; allocating portions of said state table among said character matchers such that no character matcher can be in more than one state simultaneously; comparing sequentially each input character against the token associated with the state of one or more character matchers; determining one or more next states for one or more character matchers based upon the results of the comparison; and performing one or more instructions of said one or more next states.

In another aspect, the present invention is a method for detecting matches between strings of input characters and one or more patterns, wherein each pattern is comprised of elements which are in turn comprised of tokens, said method comprising: constructing a state table associated with said pattern which comprises a plurality of states for a plurality of character matchers, wherein each state comprises one token to be compared against said input characters, one or more instructions which govern transitions to one or more next states for one or more character matchers, and one or more instructions to flag a successful match of one or more elements of said pattern; allocating portions of said state table among said character matchers such that no character matcher can be in more than one state simultaneously; constructing one or more start-up tables, each associated with one character matcher, wherein said start-up table comprises instructions which cause a transition to a specified state in its character matcher's portion of said state table upon recognition of a portion of one or more elements of said pattern; comparing sequentially each input character against the token associated with the state of one or more character matchers; determining one or more next states for one or more character matchers based upon the results of the comparison; and performing one or more instructions of said one or more next states.

In still another aspect, the present invention is a system for detecting matches between strings of input characters from a database and one or more patterns wherein each pattern is comprised of elements which are in turn comprised of tokens, said system comprising: a plurality of character matchers having one or more memories in which a portion of a state table associated with said pattern is stored such that no character matcher can be in more than one state simultaneously, wherein said portion of said state table comprises a plurality of states and each state comprises one token to be compared against said input characters, one or more instructions which govern transitions to one or more next states for one or more character matchers, and one or more instructions to flag a successful match of one or more elements; means for reading said input characters from said database; means for comparing sequentially each input character against the token associated with the state of one or more character matchers; means for determining one or more next states for one or more character matchers based upon the results of the comparison performed by the comparing means; means for performing one or more instructions of said one or more next states; and means for indicating a successful match of one or more elements of said pattern.

The state table is allocated among the character matchers so that each must check only a single input character from the database against a single token of the pattern (which can be either a test character or a character type) associated with the current state, as specified in the current state control word. That portion of the state table which determines transitions between states is included in a transition table, which comprises the token and the address in the transition table memory of the potential next state. If the comparison is successful, a transition to the next state is taken by fetching the control word at the address specified in the current control word. If it is unsuccessful, a transition is taken to a special control word, called the idle state, stored in a reserved address in the transition table memory.

In addition to these transitions based on the success or failure of matching a specified token each time a character arrives from the database memory, two other special transitions can occur. The first type of special transition, which has the highest priority of all transitions, is caused by one character matcher forcing another character matcher into a specified state. This is specified by a portion of a first character matcher's state table, which indicates one or more second character matchers to be forced to particular states and the addresses of the control words for those states within the second character matchers' state table. This operation is referred to as one character matcher forking to another, and the information describing the desired forking is stored in the fork table of each character matcher. The transition table described above and the fork table comprise the state table of a particular character matcher.

While the most general embodiment of the present invention has all character matchers connected together so that any character matcher can fork to any other character matcher, in fact little is lost if a character matcher can only fork to its two adjacent neighbors when all are connected to form a ring. This type of transition is necessary when there is more than one alternative token at a point in a pattern. For example, after matching the DO when the two specified elements of the pattern are DOG and DOT, the character matcher which has already matched DO might execute a transition to a next state which examines the next input character from the database to see if it matches the character matcher's token of G while another character matcher (forced to undergo a transition to the desired next state by the forking from the first character matcher) might see if the character from the database matches its token of a T.

The second special transition is used to start the matching process in a particular character matcher when a portion of one or more elements of the pattern is recognized. This is done by examining some number of initial characters or character types from the database to determine if it is potentially of interest. While not critical by this invention, this initial checking is included in the preferred embodiment and eliminates most instances of starting the character matcher when failure in the pattern match would occur almost immediately. For example, if a pattern were EAT and start-up was based on only the first token, a character matcher would have to be started whenever an E was detected, while if a multitoken start-up were required, matching might only begin when EA were detected, eliminating the false start on words such as EXTRA. This special start-up transition can substantially reduce the number of character matchers required, even when the start-up transition is caused by as simple a sequence as matching the type of one character from the database and matching the next character from the database exactly against a specified token of the pattern. This transition has a higher priority than a normal transition or one to the idle state, but lower than a transition caused by a fork operation. A start-up table, which is an optional component of the present invention used in conjunction with the transition and fork tables to comprise the state table, is used to implement this checking of initial sequences of characters from the database. Each such start-up table is stored in, and associated with, a particular character matcher and comprises a set of instructions which cause a transition to a specified state in its character matcher's portion of the state table upon recognition of a portion of one or more elements of the pattern.

In short, the plurality of states comprising the state table is constructed based on the tokens of the pattern. Each token in the pattern is associated with a state containing that token, instructions which govern the transitions from that state, and instructions which flag successful matches of elements of the pattern. If the optional start-up table is included, some tokens of the pattern, corresponding to portions of pattern elements, are represented by entries in the start-up table which indicate the state to which the particular character matcher will be forced when the portion of the pattern element is recognized. The techniques for converting a pattern of tokens into the corresponding state table are well known, and can be easily performed by one skilled in the art.

In contrast to the multiple-FSA technique for implementing an NFSA, the scheduling of the operations of the character matchers is determined before any matching begins and is based on the division of the original state table among the character matchers. If there is an insufficient number of character matchers to handle all the specified pattern elements, this is determined when the tables are initially allocated and corrective action (generally requiring using two or more searches, with the pattern elements divided between the different searches, and additional processing to combine the partial results from each search) can take place. With a dynamically scheduled multi-FSA approach, or with the dynamic table construction method of Thompson (U.S. Pat. No. 3,568,156, previously discussed), it is not known until sometime during the match process that there are not enough processors, causing an unexpected failure in the search.

Allocating the original state table among the character matchers requires the assurance that at times when more than one comparison is necessary, such as when there are multiple alternatives to a given subpattern, each character matcher is assigned only one of the comparisons. In other words, for any possible input character sequence, it must be impossible for a character matcher to be in more than one state. This means that one character matcher cannot be forced into a state by forking from a second character matcher, nor can a character matcher execute a start-up sequence, while that character matcher is actively tracking a pattern. This requires the testing of each state to see if it is compatible (meaning it is impossible for it to be required at the same time) with all other states prior to starting the matching operation. Only compatible states can be assigned to the same character matcher. In effect, this means that no character matcher can be in more than one state simultaneously.

The basic technique for this compatibility testing is similar to the algorithms for state minimization of sequential machines by testing for compatible states, a technique well documented in the prior art (for example, see *Algebraic Structure Theory of Sequential Machines* by Harmanis and Stearns, Prentice-Hall 1966 or *Sequential Machine and Automata Theory* by Booth, Wiley 1968). After all compatibility classes of states are formed, a suitable allocation or partitioning of the states among the available character matchers can be made. There is no requirement that this partitioning be optimal—any partitioning that observes state compatibility is sufficient for correct operation of this invention. States are then mapped directly into control words, stored in any available address within the transition table and fork table memories, with the token field of the control word formed from the token in the user's pattern and the next address field and the control bits formed from the type of transition and the address allocated to the next state. A more detailed discussion on how to allocate states between character matchers is contained in *Hardware for Searching Very Large Text Databases* by Haskin (Report 1027, Department of Computer Science, Univ. of Illinois at Urbana-Champaign, August 1980), which is expressly incorporated herein by reference and made a part hereof, especially in Chapter 3 entitled "State Assignment".

When the appropriate state tables have been loaded into memories in the various character matchers, searching starts by sequentially comparing each character supplied from the database against the token associated with the present state of each character matcher. Based upon this comparison, each character matcher determines the next state of itself and, in forking situations, the next state of one or more other character matchers. The instructions of such next states are then performed. This may result in start-up transitions, normal state transitions, transitions to the idle state, or transitions forced by another character matcher, all generally different for each character matcher. When a character matcher finds a state control word with a special hit flag set, it knows that this corresponds to a terminal state on a conventional finite state automaton and that one or more of the pattern elements has been successfully matched. When this occurs, it transfers information to the user indicating the address of the control word corresponding to the state where the match occurred, which in turn indicates which pattern was successfully matched.

As can be seen, the present invention provides many advantages over the prior art. It does not require the large state table memory of the normal FSA (for an alphabet of N characters and M states, on the order of $N \times M \times \log M$ bits is required). Instead, on the order of $N \times \log M$ bits of memory distributed among the character matchers in the configuration is suitable for the present invention. The present invention also does not require the elaborate sequencing mechanism of the Bird FSA implementation, and, unlike other FSA implementations other than the large memory configuration, can process characters from the database at a uniform rate synchronized to the database memory system to which it is attached, especially important on memory systems such as magnetic disks where the delivery rate of characters cannot be easily controlled. Finally, the present invention does not require the dynamic scheduling of the multi-FSA implementation of an NFSA or the Thompson algorithm, eliminating the difficulty of failing due to lack of resources while in the midst of a search.

This invention and its features and various advantages will be more readily understood upon consideration of the attached drawings and the following detailed description of its preferred embodiment.

DESCRIPTION OF THE PREFERRED EMBODIMENT

Figure 1:
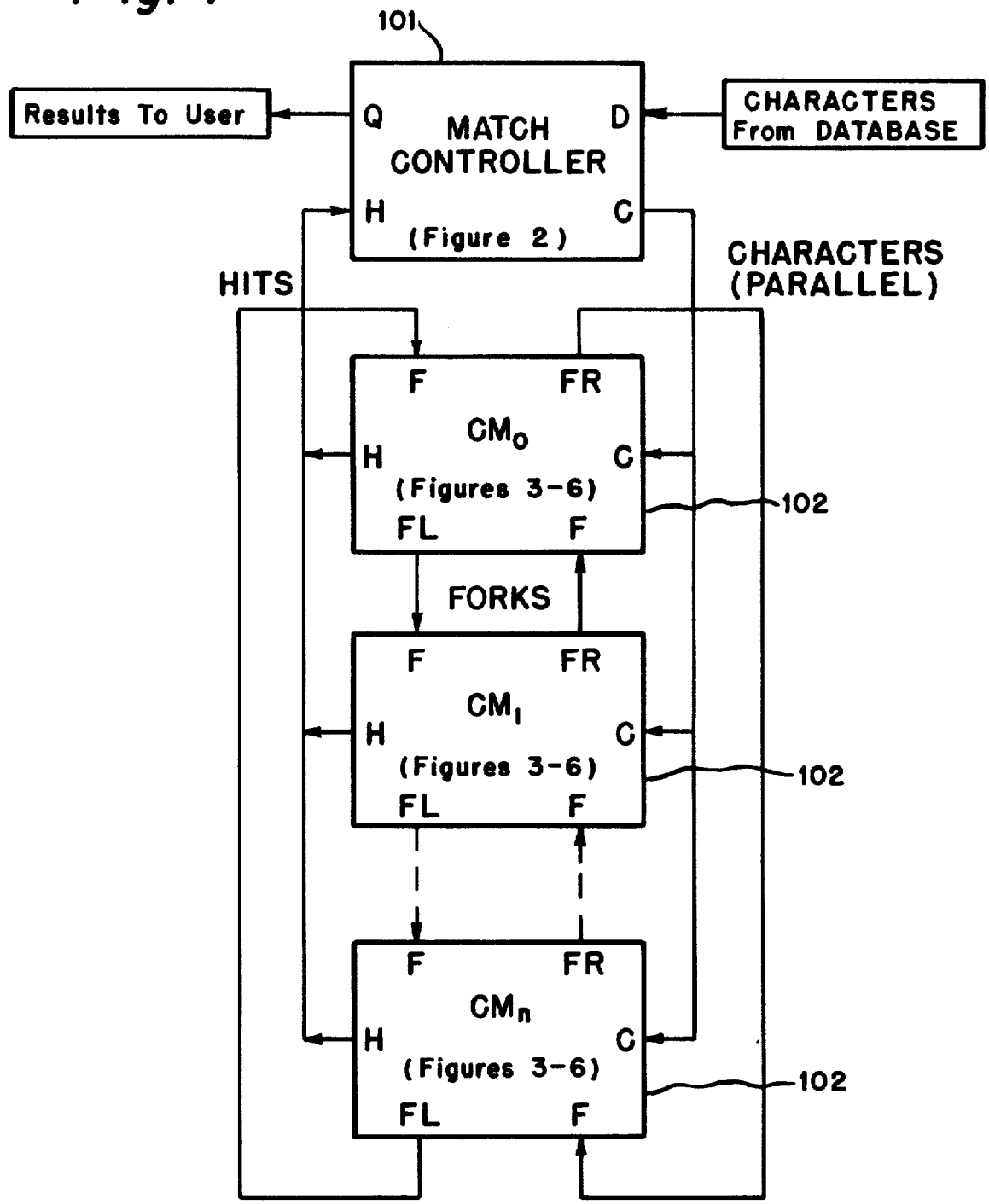
FIG. 1 is a schematic block diagram indicating how the major components of the system are interconnected in the preferred embodiment.

The preferred embodiment of this invention, as illustrated in FIG. 1, comprises two different components: two or more digital processors called character matchers 102 (also denoted $CM_0$ through $CM_n$ in the figure) and a match controller 101 (MC in the figure). The match controller 101 contains hardware functions used in common between the character matchers 102, and will be described in detail shortly. All character matchers 102 are connected to the match controller 101 by two busses, the C bus shown on the right of FIG. 1 and the H bus on the left. The C bus transmits characters from the match controller to the character matchers; it also carries all control and timing signals from the match controller to the character matchers. The H bus is used to transmit results of the matching operation from the character matchers to the match controller, for later transfer from the system to the user. Note that there is no requirement to transfer control information from the character matchers to the match controller, other than reports of successful matches transferred on the common H bus. Furthermore, because potential conflicts regarding which character matcher 102 will transmit the result of a match operation can be resolved before the matching operation is started, no arbitration logic is required to assure correct sequencing of data on the H bus.

In the preferred embodiment, the individual character matchers 102 are connected to each other to form a ring, with each character matcher connected by two busses (one for transferring information in each direction) to each of its two neighbors in the ring. The input F of each character matcher is connected to both FR from its neighbor on the right and FL on its left; two F inputs are shown in FIG. 1 for each character matcher, but these are the same input and are only illustrated in this fashion to simplify the drawing. This ring connection technique simplifies the implementation of the preferred embodiment, but is not necessary in the present invention.

Figure 2:
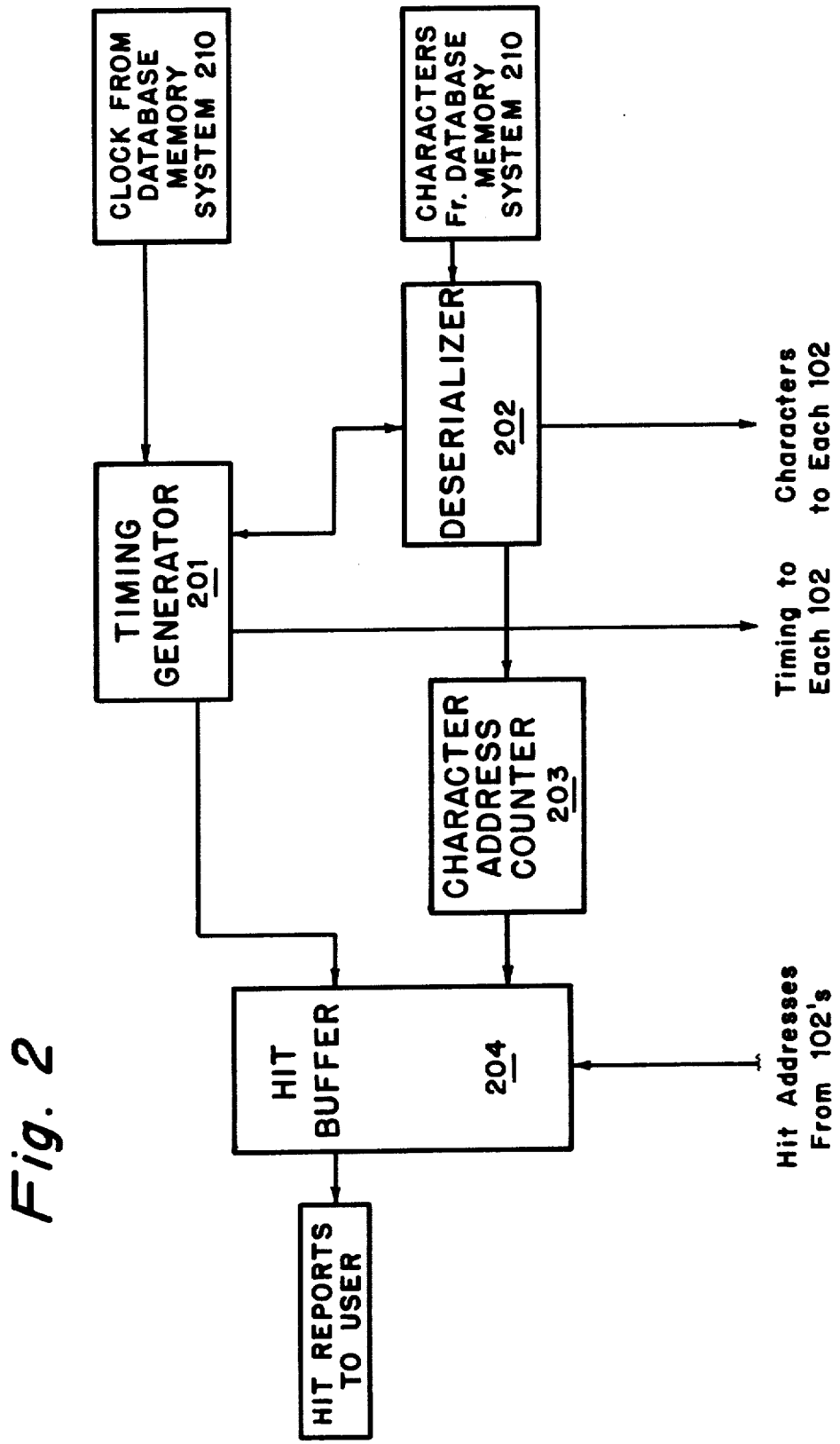
FIG. 2 is a schematic block diagram of the preferred match controller component of the system, labeled 101 in FIG. 1.

FIG. 2 is a schematic block diagram of the match controller 101 of FIG. 1. The actual implementation of the blocks of this diagram depend heavily on the format of data from a suitable memory device 210 containing the database to be searched, the format of results required by the user of the invention, and the exact timing of the memory devices used in implementing the character matchers, but suitable implementations should be readily apparent to any person skilled in the art. A timing generator 201 which, in this embodiment, takes clocking information supplied by the memory system 210 containing the database being searched and generates the timing signals necessary for controlling other portions of the match controller and the character matchers. The deserializer 202 is a generally known circuit for recognizing the start of data delivered from the database memory system 210 and converting a serial stream of data bits into characters which can be transmitted on the C bus of FIG. 1 in parallel to the character matchers 102; if the data from the memory 210 is already in the form of parallel bits representing characters, this latter operation of the deserializer 202 is not required. 203 is a standard counter which is set to a predetermined value (generally zero) when the start of the characters first arrive from the database, and is incremented by one each time a character arrives from the database memory 210 through the deserializer 202. Finally, 204 is a first-in-first-out buffer where the hit data from the character matchers is converted to the form required by the user, possibly with the value of counter 203 added to the information from the character matchers.

Figure 3:
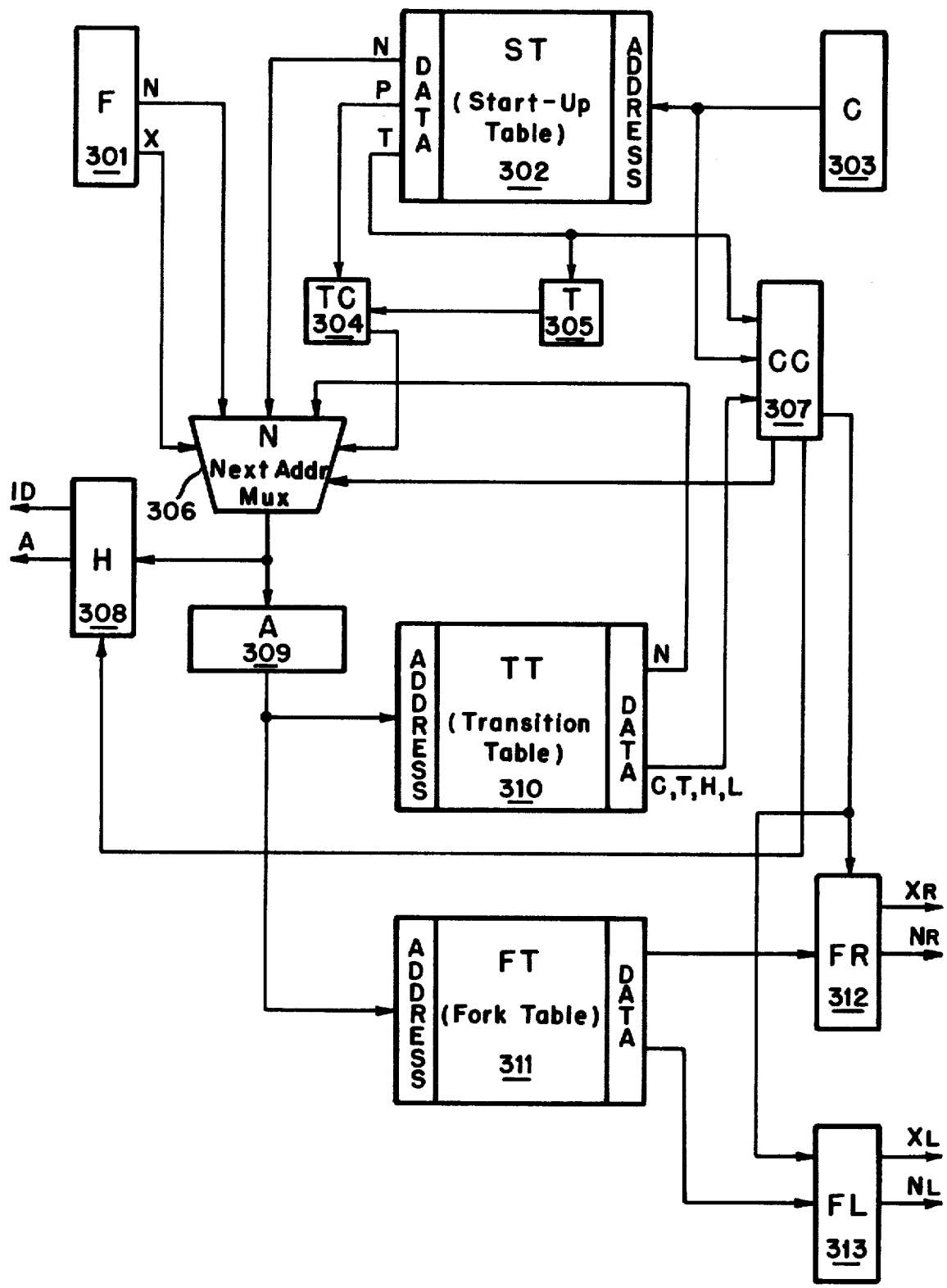
FIG. 3 is a schematic block diagram of the preferred character matcher component of the system, labeled 102 in FIG. 1.

FIG. 3 illustrates the major components of the character matcher 102 of FIG. 1. It primarily includes three random access memories containing the start-up table (ST) 302, the transition table (TT) 310, and the fork table (FT) 311. FIG. 3 shows only those data and control paths used during the matching operation of the character matcher. Additional paths and control signals, dependent on the type of memory used to implement the character matcher, is required to load data into each of the three memories 302, 310, and 311 before starting a match operation. For example, one may use the H and C busses from the match controller to the character matchers (and possibly using the H bus in a reverse direction, transferring from the match controller to the character matchers) and many of the existing data paths within the character matcher to present addresses and data to the three memories 302, 310, and 311 for loading. If this is inconvenient, separate data, address, and control lines can be added to the circuit illustrated to handle the loading operations. The exact implementation needed for a particular memory type or configuration can be easily produced by one skilled in the art.

Figure 4:
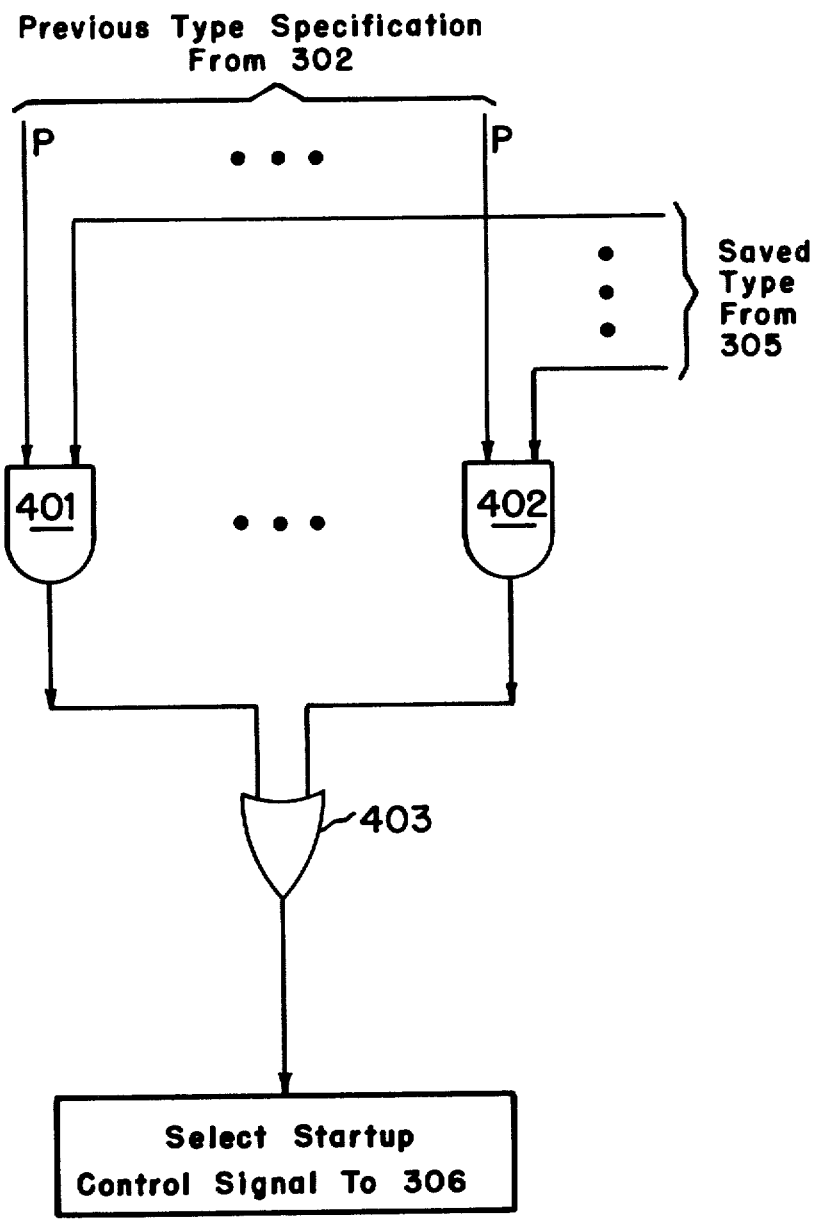
FIG. 4 is a logic diagram of the preferred type comparator circuit of the character matcher, labeled 304 in FIG. 3.

FIG. 4 illustrates the logic of the type comparator 304. It comprises a number of AND gates 401,402 connected to an OR gate 403. The number of AND gates depends on the number of different type specifications desired. In a minimal system only three different type specifications, (alphanumeric, punctuation, delimiter), three AND gates would be necessary. In most systems, additional subdivisions of these type specifications may be necessary, such as dividing the alphanumeric type specification into numeric, consonant, and vowel. The type comparator 304 simply tests the previous character type stored in the previous type register 305 against the acceptable previous character types, encoded in the P field of the word from the start-up table 302, and if any bit is set in both, indicates a type match.

Figure 5:
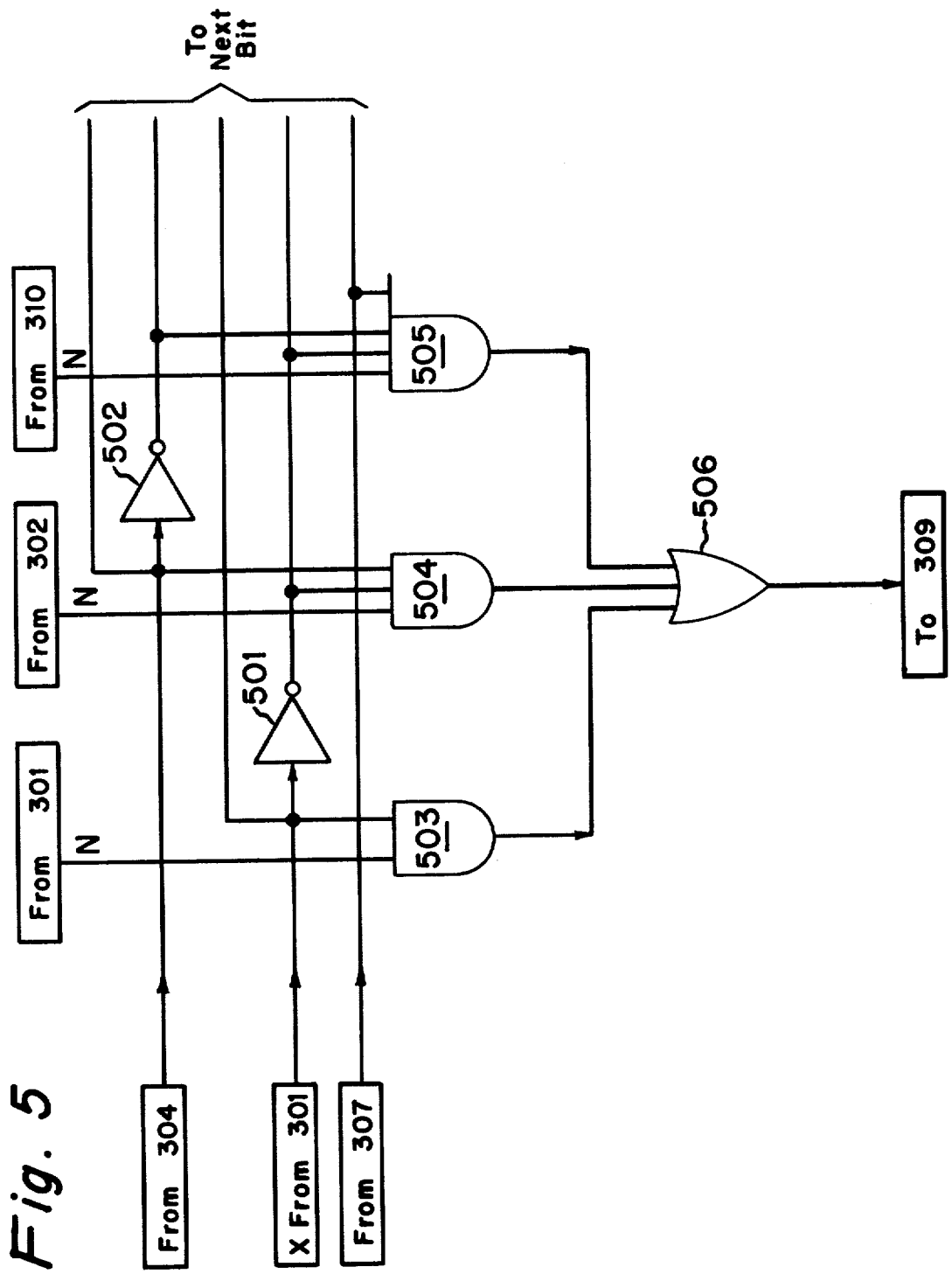
FIG. 5 is a logic diagram of the preferred next address multiplexor circuit of the character matcher, labeled 306 in FIG. 3.

The remaining two memories, TT 310 and FT 311 are addressed by the contents of the A register 309, which receives its data from the next address multiplexor N 306. The circuit for one bit of the next address multiplexor 306 is illustrated in FIG. 5. It receives addresses from three sources (the start-up table memory 302, the F input port 301, and the transition table memory 310) along with three control signals from the F input port 301, the type comparator 304, and the character comparator 307. Selection of the address is based on the result of the prior comparison through a priority determination system, with the highest priority being the address from the F port if the signal X from input 301 is active; the next priority is from the start-up table 302 if the output of the type comparator 304 indicates a type match; the next from the transition table 310 if the character comparator 307 control signal is active; and finally, if none of the control conditions are true, an address of zero (corresponding to a transition to the idle state).

Figure 6:
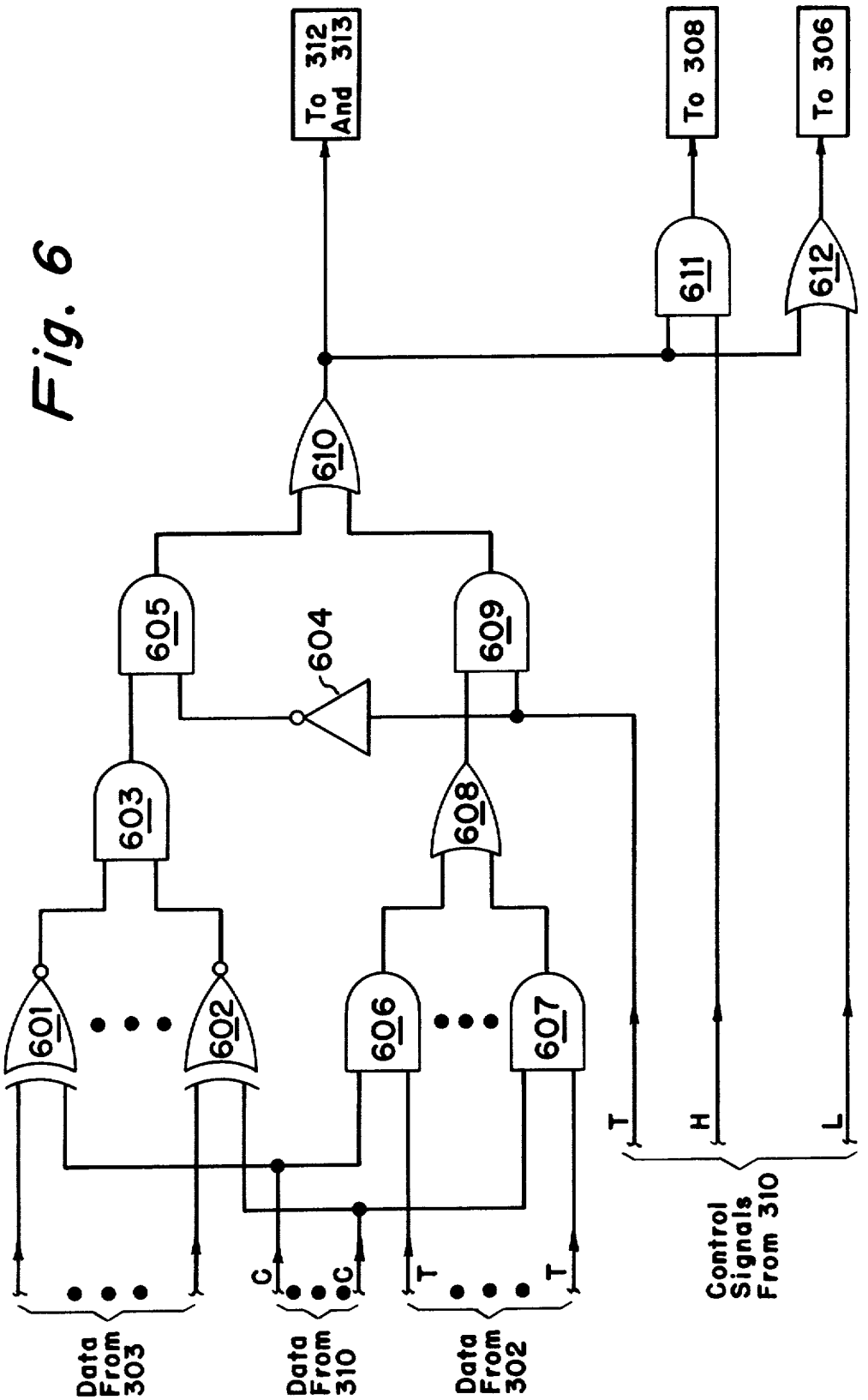
FIG. 6 is a logic diagram of the preferred character comparator circuit of the character matcher, labeled 307 in FIG. 3.

The character comparator circuit 307 is illustrated in FIG. 6. It includes two comparison sections: an equality detector which produces a signal when the character received at the C register 303 from the database has an identical encoding as the character field of the current word from the transition table memory 310 (field C in FIG. 8), formed by a number of exclusive-NOR gates (one per bit of the character) 601 and 602 and an AND gate 603; and a type comparator similar to 304 previously described in FIG. 4, formed by one AND gate per type bit 606 and 607 and an OR gate 608. The remaining logic determines if a type comparison or a character comparison is desired, based on the T signal from the output word of the transition table memory 310 (implemented with gates 604, 605, 609, and 610). This result is supplied to the FR 312 and FL 313 output drivers; it is also combined with the H signal from the output word of the transition table memory 310 using AND gate 611 to control the H output drivers 308 and the L signal using OR gate 612 to control the next address multiplexor 306.

Figure 7:
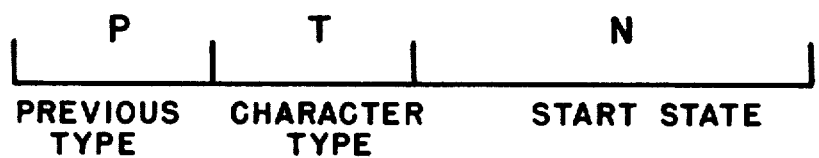
FIG. 7 is an illustration of the preferred format of the data stored in the start-up table memory of the character matcher, labeled 302 in FIG. 3.

Operation of the character matcher is cycled every time a character arrives from the database through the match controller 101 and port C 303. This port contains no circuitry and is simply a connector for incoming characters. The character is applied to the start-up table memory 302 as its address, causing a word of data formatted as in FIG. 7 to be read out of memory 302. There is one word in memory 302 for each possible input character, so if the input characters were represented with eight bits of information, for an input alphabet consisting of 256 distinct characters, there would be 256 words in the memory. The word read from memory 302 contains three fields of information as illustrated in FIG. 7: a previous type field, which specifies which types of input characters must have immediately preceded the current input character for a start-up transition to occur (labeled P in FIG. 7), the type of current character applied to the character matcher at the C port 303 (labeled T in FIG. 7), and the starting state address if a start-up operation is required (labeled N in FIG. 7). The data from the character type field is sent to the character comparator 307 and latched in the type register 305 to become the previous character type on the next cycle.

Figure 8:
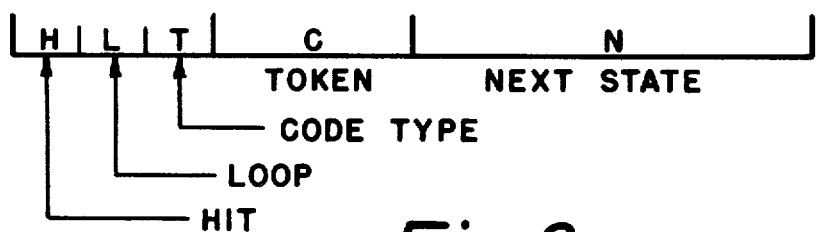
FIG. 8 is an illustration of the preferred format of the data stored in the transition table memory of the character matcher, labeled 310 in FIG. 3.
Figure 9:
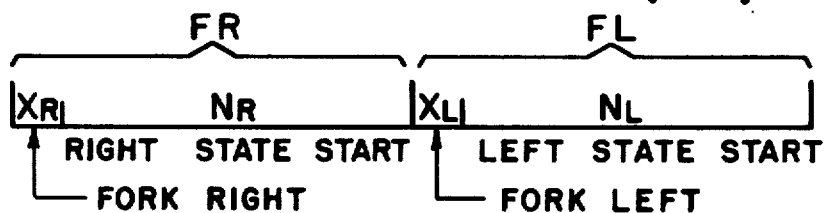
FIG. 9 is an illustration of the preferred format of the data stored in the fork table memory of the character matcher, labeled 311 in FIG. 3.

Referring again to FIG. 3, the transition table memory 310 receives its address from the A register 309 and outputs a data word with a format as illustrated in FIG. 8. This comprises a character or type specification (depending on the setting of the code type bit T in the word) in the C field, a next state address N, and two other control bits directed to the character comparator logic 307, called hit (H) and loop (L). The fork table memory 311 also receives its address from the A register 309 and outputs a data word with a format such as illustrated in FIG. 9. It comprises two fields, FR and FL, corresponding to the information to be transmitted to the character matcher's right or left neighbor, each with two subfields X and N. The N subfield is the address of the next control word the specified neighboring character matcher read and execute from its transition table 310 and fork table 311 memories, and the X subfield is a flag which indicates that an address is specified. This data is sent to the FR 312 and FL 313 output drivers which are enabled if the corresponding X flag is set and the control signal from the character comparator 307 is active. The F input port 301 is connected to the FR output drivers 312 of one of its neighbors and the FL output drivers 313 of it other neighbor, requiring that the drivers be implemented without active pullup stages (for example, open-collector or tri-state transistor-transistor logic families). Collectively, the transition table 310 and fork table 311 memories comprise the portion of the state table allocated to the particular character matcher, with each word comprising the token associated with its particular state, the instructions which govern the transitions from that state, and instructions which govern the flagging of successful matching of an element of the pattern.

The H output drivers 308 are used to place the results of a successful match operation, as indicated by the H flag being set in the transition table memory 310 output word, on the H bus to the match controller 101. The information transferred includes the address of the word in the transition table memory 310 concatenated with an encoded field identifying the particular character matcher 102.

To illustrate how the three memories of the character matcher may be loaded for a match operation, consider attempting to match the pattern whose elements are the following seven times:

A?ISM#
IST#
SCHISM#
BEST
BENT#
BUNT
BUNTED# where # is a token indicating any word-break delimiter (such as a space or a punctuation mark) is acceptable at that point in the pattern and ? is a token indicating that an arbitrary number of alphanumeric characters (possibly none) can occur in that position. Another special token, @ will be used to indicate a character of alphanumeric type. Note that tokens can be either characters or special symbols representing classes of characters and each element of a pattern is composed of tokens.

Before the actual matching of the data from the attached memory 210 begins, the start-up table 302, transition table 310 and fork table 311 of each character matcher 102 must be loaded. The contents of these tables are determined based on compatibility tests between the various pairs of states, as was discussed previously. For the seven terms given above, there are a number of different assignments which can be made. The one selected for this example requires the use of three character matchers 102, to be denoted $CM_0$, $CM_1$, and $CM_2$, which is the minimum required for any possible allocation of the state table for the pattern whose elements are the seven terms above. These tables are constructed in accordance with the procedures described above and in Chapter 3 of *Hardware for Searching Very Large Text Databases* by Haskin, previously cited.

Table I indicates the contents of the start-up table memory 302, transition table memory 310, and fork table memory 311 for the character matcher referred to as $CM_0$. In the first portion of Table I the combined contents of the control words from the transition table 310 and fork table 311 memories which are stored in corresponding addresses are presented. The Addr column indicates the address in 310 or 311 where the particular control word is stored, and does not represent data actually stored as part of the control words. The Hit, Loop, and Type columns of Table I correspond to the H, L, and T fields of the control word from the transition table memory 310, as illustrated in FIG. 8 (with '-' indicating the control flag is not set and X that it is set), with the Hit column indicating that a match has been found and must be reported to the match controller 101. The L and T fields are used as control signals to the character comparator 307, the Character and Next columns are the C and N fields of the control word from 310. The Next Right and Next Left columns in Table I correspond to the FR and FL fields in the control word from the fork table 311 as illustrated in FIG. 9, with a '-' indicating that no fork will occur. The State field indicates where on the NFSA state diagram (FIG. 10) the state corresponding to the particular control words occurs, and is not part of the control words.

TABLE I

| $CM_0$ Memory Contents ||||||||
|---|---|---|---|---|---|---|---|---|
| Addr | Hit | Loop | Type | Token | Next | Next Right | Next Left | State |
| 0 | — | X | X | '#,@' | 0 | — | — | Idle |
| 1 | — | — | — | S | 2 | — | — | 5 |
| 2 | — | — | — | T | 3 | — | — | 6 |
| 3 | X | — | X | '#' | 0 | — | — | 7 |
| 4 | — | — | — | E | 5 | — | 1 | 14 |
| 5 | — | — | — | N | 6 | — | — | 17 |
| 6 | — | — | — | T | 7 | — | — | 18 |
| 7 | X | — | X | '#' | 0 | — | — | 19 |

| StartUp Table Special Entries |||
|---|---|---|
| Character | Previous Type | Start Address |
| B | # | 4 |
| I | Any | 1 |

The second portion of Table I shown contains only those words of the start-up table memory 302 which contain special entries, such as entries which cause a starting state transition to be detected by the type comparator 304. The particular input character which triggers a start-up is shown in the Character column in Table I, while the Start Address column corresponds to the P and N fields of the control words of start-up memory 302 as illustrated in FIG. 7, and indicate the control word address where the character matcher is forced when the given start-up sequence of characters occurs. The character type field T of the control word is not shown. Except for the entries for B and I, all remaining entries in the start-up table 302 (one for each character in the possible input alphabet) specify the type T of the particular character but contain a previous type field P of all zero bits. As no type match for these is possible, no start-up can occur, and they are not shown in the start-up portion of Table I.

The memories 302, 310, and 311 for the second character matcher 102, to be referred to as $CM_1$, are organized similarly. Their contents are indicated in Table II.

TABLE II

| | | | CM₁ Memory Contents | | | | |
|---|---|---|---|---|---|---|---|
| Addr | Hit | Loop | Type | Token | Next | Next Right | Next Left | State |
| 0 | — | X | X | '#,@' | 0 | — | — | Idle |
| 1 | — | — | — | S | 2 | — | — | 15 |
| 2 | X | — | — | T | 0 | — | — | 16 |
| 3 | — | — | — | S | 4 | — | — | 2 |
| 4 | — | — | — | M | 5 | — | — | 3 |
| 5 | X | — | X | '#' | 0 | — | — | 4 |
| 6 | — | — | — | C | 7 | — | — | 8 |
| 7 | — | — | — | H | 8 | — | — | 9 |
| 8 | — | — | — | I | 9 | — | — | 10 |
| 9 | — | — | — | S | 10 | — | — | 11 |
| 10 | — | — | — | M | 11 | — | — | 12 |
| 11 | X | — | X | '#' | 0 | — | — | 13 |

| StartUp Table Special Entries | | |
|---|---|---|
| Character | Previous Type | Start Address |
| S | # | 6 |

Similarly, the contents of memories 302, 310, and 311 for $CM_2$ are illustrated in Table III.

TABLE III

| | | | CM₂ Memory Contents | | | | |
|---|---|---|---|---|---|---|---|
| Addr | Hit | Loop | Type | Token | Next | Next Right | Next Left | State |
| 0 | — | X | X | '#,@' | 0 | — | — | Idle |
| 1 | — | — | — | U | 2 | — | — | 20 |
| 2 | — | — | — | N | 3 | — | — | 21 |
| 3 | X | — | — | T | 4 | — | — | 22 |
| 4 | — | — | — | E | 5 | — | — | 23 |
| 5 | — | — | — | D | 6 | — | — | 24 |
| 6 | X | — | X | '#' | 0 | — | — | 25 |
| 7 | — | X | — | I | 7 | 3 | — | 1 |

| StartUp Table Special Entries | | |
|---|---|---|
| Character | Previous Type | Start Address |
| A | # | 7 |
| B | # | 1 |
| Non-alpha | @ | 0 |

Notice that in the start-up table for $CM_2$, as shown in Table III all non-alphabetic characters have an entry which causes the character matcher to start in address 0 whenever the previous character was alphanumeric. Again, all alphanumeric characters except A and B are not shown in Table III, and contain a previous type field of all zeros so that no start-up transition can occur for those characters.

Figure 10:
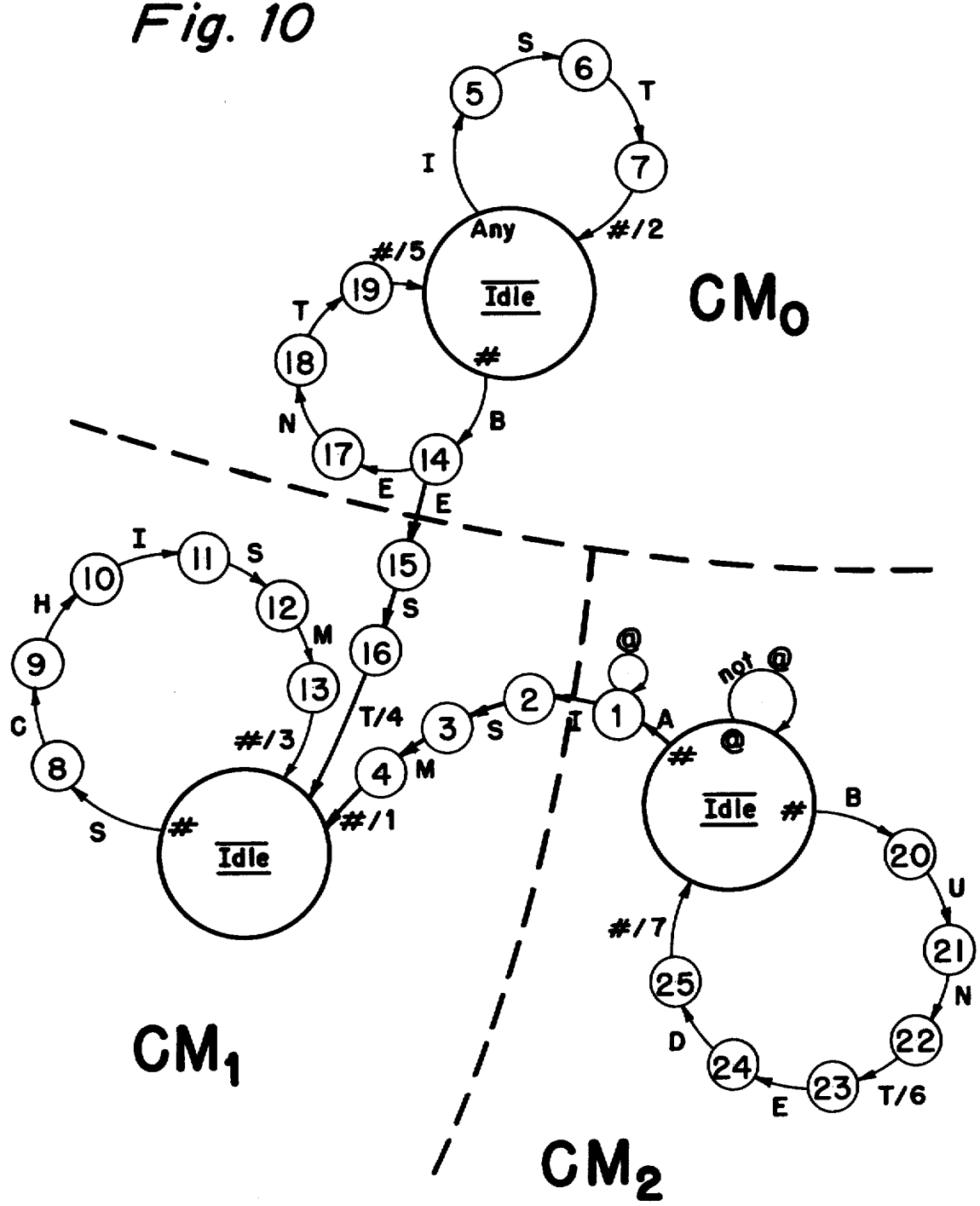
FIG. 10 is an example state transition diagram for matching seven different pattern elements using three character matchers.

After memories 302, 310, and 311 have been loaded, the set-up operations are complete and the normal operation of sequentially comparing input characters from the database against tokens of the pattern can begin. Each character matcher transitions to the next state based on the results of comparisons against the tokens associated with the current states of the various character matchers against the current character from the database. FIG. 10 is a special NFSA state diagram which illustrates the operation of the three character matchers 102 when loaded with the information described in Tables I, II, and III. In FIG. 10 the larger circles represent the idle states (corresponding to the control words stored in address 0 of the transition tables 310), the initial starting state of each character matcher and the state to which a character matcher will return if a comparison operation fails. The smaller circles represent the other states, with the number in each referring to the "State" in the control words in Tables I, II, and III. A state can be regarded as the composite of the information contained in the control words from the transition table 310 and fork table 311 memories, and represented by a line in Table I, II, or III.

The directed arcs represent possible transitions between states, with the character or type which causes the transition denoted by label on the arc. If a slash (/) followed by a number is included in the transition label, it indicates that when that transition occurs that term from the list of seven above has been recognized, and a hit should be reported to the match controller 101. Finally, transitions from the idle state in FIG. 10 contain a type identifier at the base of the arc denoting start-up terms, indicating the previous type field in the startup table 302 which must be satisfied along with the character on the transition label for the startup action to be taken. Transitions correspond to the selection of the correct next control word (or state) address by the next address multiplexor 306 and placing it into register 309 of FIG. 3. The three match controllers are indicated by the three areas of FIG. 10 separated by the dashed lines.

In the following discussion, the term "character" means an input character received at the C port 303 through the match controller 101 from the attached memory system containing the database being searched, and "token" represents either a type specification or an exact character match specification in a pattern being searched for—represented by the label on an arc in the NFSA state diagram of FIG. 10, by the T and C fields of the control word from the transition table memory 310 of FIG. 8, and by the Type and Token columns of Tables I, II, or III.

Referring to the portion of FIG. 10 corresponding to $CM_0$, there is a transition from the idle state to State 5 in FIG. 10 when the character I follows any character. This is also indicated by the last line of Table I, which describes an entry in the start-up table 302 which causes a start-up transition whenever the character I follows a character of any type. The control words in the transition table 310 and fork table 311 memories corresponding to State 5 in FIG. 10 are:

| Addr | Hit | Loop | Type | Token | Next | Next Right | Next Left |
|---|---|---|---|---|---|---|---|
| 1 | — | — | — | S | 2 | — | — |

This line indicates that a normal exact match, rather than type, comparison should be performed by the character comparator 307, and if the character currently being received at input register 303 matches the specified token S the next state should correspond to the control words at address 2 of memories 310 and 311 of $CM_0$, which corresponds to State 6 in FIG. 10. If the character is not an S, the character matcher returns to the idle state. Operation in a similar fashion continues with the matching of the character T which causes a transition to State 7 of FIG. 10. The control words in memories 310 and 311 corresponding to State 7 contain:

| Addr | Hit | Loop | Type | Token | Next | Next Right | Next Left |
|------|-----|------|------|-------|------|------------|-----------|
| 3    | X   | —    | X    | '#'   | 0    | —          | —         |

This indicates that a type compare against the word-break type should be performed by the character comparator 307. If successful, a transition to State 0 (the idle state) should occur. In addition, if the comparison is successful, a hit should be reported to the match controller 101 indicating the current control word address (in this case, 3) and the identifier of the particular character matcher 102 (in this case, $CM_0$). The match controller 101 then maps this information to indicate to the user that term 2 from the list of terms has been found.

The operation of the loop of states in $CM_1$ beginning with State 8 and in $CM_2$ beginning with State 20 is similar to that discussed above, except that the loop for $CM_2$ can report two hits, one during the transition from State 22 to 23 and one from 25 to the idle state.

The loop of states which starts from $CM_0$ with the transition to State 14 illustrates how a fork operation is used when more than one token is of interest when in a given state. In particular, it is used to match the terms #BEST and #BENT#. State 14 of FIG. 10, which is stored at address 4 in $CM_0$, contains the following information:

| Addr | Hit | Loop | Type | Token | Next | Next Right | Next Left |
|------|-----|------|------|-------|------|------------|-----------|
| 4    | —   | —    | —    | E     | 5    | —          | 1         |

This indicates that the input character should be compared against the token E. If successful, not only should the next control words come from address 5 (State 17 in FIG. 10) but a fork to the character matcher on the left ($CM_1$) is to be made, forcing it to start with the control words stored in address 1 (which corresponds to State 15 in FIG. 10). Therefore, $CM_0$ continues looking for #BENT# while $CM_1$ begins looking for #BEST.

The final variant of the character matcher operation is illustrated by the string of states in FIG. 10 which starts with the transition out of the idle state of $CM_2$ to State 1. This is used to match the string #A?ISM#, where the token ? indicates that an arbitrary number of characters, including none, will be accepted in that location. The control words corresponding to State 1 in $CM_2$'s transition table 310 and fork table 311 memories contains:

| Addr | Hit | Loop | Type | Token | Next | Next Right | Next Left |
|------|-----|------|------|-------|------|------------|-----------|
| 7    | —   | X    | —    | I     | 7    | 3          | —         | which indicates that a loop operation is to be performed. This means that the address of the next control word will not depend on the success of the character or type comparison performed by the character comparator 307, but will go to address 7 unless a fork or start-up transition, which have higher priorities than normal transitions, occurs. This causes the character matcher to remain in State 1 of FIG. 10. The fork operation to the control words at address 3 of the character matcher to the right of $CM_2$, which is $CM_1$, occurs whenever the character comparator detects a character I and activates the FR output drivers 312. This means that a fork transition to State 2 of FIG. 10 occurs whenever a possible match starting with an I is detected. The loop in State 1 of FIG. 10 is terminated by the start-up transition from $CM_2$'s idle state back to the idle state as illustrated by the loop containing no states. This is a start-up transition which occurs whenever $CM_2$ detects a non-alphabetic character following an alphabetic character. Since a start-up transition has priority over normal or loop transitions, this will force the character matcher into the idle state at address 0.

The effects of the compatibility tests and state assignment procedures can be seen in the operation of the forks from one character matcher to another. For example, the fork to State 15 of FIG. 10 is safe since it is impossible for $CM_1$ to be in an state other than the idle state when the fork occurs. This is obvious, since to get to State 15 the previous characters must have been #BE, while the only other loops of states in $CM_1$ start with #S or #A, clearly different from #BE. Similar arguments hold for all other forks between character matchers.

From the above description, it is apparent that the device and method is capable of comparing a string of digitally encoded characters against as many pattern elements as can be partitioned into the available character matchers. These pattern elements can contain special tokens which indicate that characters of particular types or that an arbitrary number of characters will be accepted in that location.

In addition to its advantages over the prior art, such as small memory requirements, fixed processing time for each character from the database, and static scheduling and memory allocation, discussed previously, because of its regular structure, comprising a number of similar character matchers which primarily contain random access memory which must be cycled only once per character received, implementation using large scale integrated circuit techniques is readily accomplished. This is further enhanced by the limited number of connections required between the various major components (the character matchers and the match controller) of the system.

It is to be understood that the above description of the preferred embodiments is merely illustrative of numerous and varied other arrangements or implementations which constitute applications of the principles of the invention. Such other arrangements or implementations may readily be devised by those skilled in the art without departing from the spirit or scope of this invention.

We claim:

1. A method, for detecting matches between strings of input characters and one or more patterns, each pattern comprising elements consisting of tokens, employing a finite state automaton, responsive to said strings of input characters, comprising a plurality of character matchers acting in concert; each character matcher being characterized as capable of existing in one of a plurality of states, each such state having (a) one token from a pattern, to be compared against a current input character, (b) first instructions, which govern transitions to the next state of said character matcher, and (c) second instructions, which force other character matchers into specified states; each character matcher being further characterized as having at least an initial state, to be occupied by said character matcher at the start of the matching procedure, and an idle state, to be occupied by said character matcher after an unsuccessful comparison between the token specified in the current state of said character matcher and the current input character; the respective states being partitioned among said character matchers to avoid any sequence of input characters requiring any character matcher to be simultaneously in more than one state; said method, for each string of input characters to be matched and for each character matcher, comprising:

(a) comparing, with the character matcher in its initial state, a first input character against the token specified in the initial state of the character matcher, whereby said comparison is either successful or unsuccessful;

(b) transitioning, in consequence of an unsuccessful comparison, to the idle state of the character matcher;

(c) transitioning, in consequence of a successful comparison, to a succeeding state, in accordance with instructions contained in the current state of the character matcher;

(d) forcing other character matchers into new states specified in the instructions of the current state of the character matcher of step (c);

(e) comparing a succeeding input character against the token specified in the succeeding state and transitioning to a further succeeding state in accordance with steps (b), (c), and (d); and (f) repeating step (e) until all input characters have been compared.

2. The method of claim 1 wherein the initial state and the idle state comprise a single state.

3. The method of claim 1 wherein the plurality of character matchers are disposed in a ring configuration wherein each character matcher is capable of forcing only the two neighboring character matchers into a specified state.

4. The method of claim 1 wherein the input characters are stored in and delivered to the finite state automaton from a serial access memory device.

5. The method of claim 4 wherein the comparison and transitioning steps for each character matcher are synchronized to the character delivery rate of the serial access memory device.

6. The method of claim 1 wherein each state additionally has instructions which indicate a successful match of an element of the pattern.

7. The method of claim 6 wherein the indication of a successful match additionally includes an identifier for the specific element of the pattern that has been matched.

8. The method of claim 7 wherein the elements of the pattern correspond to words and phrases, whereby the indication of a successful match signifies that a particular word or phrase occurs in a particular string of input characters.

9. A method, for detecting matches between strings of input characters and one or more patterns, each pattern comprising elements consisting of tokens, employing a finite state automaton, responsive to said strings of input characters, comprising a plurality of character matchers acting in concert; each character matcher being characterized as capable of existing in one of a plurality of states, each such state having (a) one token from a pattern, to be compared against a current input character, (b) first instructions, which govern transitions to the next state of said character matcher, (c) second instructions, which force other character matchers into specified states, and (d) a start-up table, responsive to said input character, which causes said character matcher to transition to a specified state upon recognition of a portion of one or more elements of said pattern; each character matcher being further characterized as having at least an initial state, to be occupied by said character matcher at the start of the matching procedure, and an idle state, to be occupied by said character matcher after an unsuccessful comparison between the token specified in the current state of said character matcher and the current input character; the respective states being partitioned among said character matchers to avoid any sequence of input characters requiring any character matcher to be simultaneously in more than one state; said method, for each string of input characters to be matched and a corresponding character matcher, comprising:

(a) comparing, with the character matcher in its initial state, a first input character against the token specified in the initial state of the character matcher, whereby said comparison is either successful or unsuccessful;

(b) transitioning, in consequence of an unsuccessful comparison, to the idle state of the character matcher;

(c) transitioning, in consequence of a successful comparison, to a succeeding state, in accordance with instructions contained in the current state of the character matcher;

(d) transitioning to the specified state in response to instructions from the start-up table of said character matcher whenever such a transition is so indicated;

(e) forcing other character matchers into new states specified in the instructions of the current state of the character matcher of step (c);

(f) comparing a succeeding input character against the token specified in the succeeding state and transitioning to a further succeeding state in accordance with steps (b), (c), (d), and (e); and (g) repeating step (e) until all input characters have been compared.

10. The method of claim 9 wherein the initial state and the idle state comprise a single state.

11. The method of claim 9 wherein the plurality of character matchers are disposed in a ring configuration wherein each character matcher is capable of forcing only the two neighboring character matchers into a specified state.

12. The method of claim 9 wherein the input characters are stored in and delivered to the finite state automaton from a serial access memory device.

13. The method of claim 12 wherein the comparison and transitioning steps for each character matcher are synchronized to the character delivery rate of the serial access memory device.

14. The method of claim 9 wherein each state additionally has instructions which indicate a successful match of an element of the pattern.

15. The method of claim 14 wherein the indication of a successful match additionally includes an identifier for the specific element of the pattern that has been matched.

16. The method of claim 15 wherein the elements of the pattern correspond to words and phrases, whereby the indication of a successful match signifies that a particular word or phrase occurs in a particular string of input characters.

17. A system for detecting matches between strings of input characters from a database and one or more patterns, each pattern comprising elements consisting of tokens, employing a finite state automaton, responsive to said strings of input characters, comprising a plurality of character matchers acting in concert; each character matcher being characterized as capable of existing in one of a plurality of states, each such state having (a) one token from a pattern, to be compared against a current input character, (b) first instructions, which govern transitions to the next state of said character matcher, and (c) second instructions, which force other character matchers into specified states, each character matcher being responsive to one or more memories, comprising control words and storing tokens and instructions for a particular state; each character matcher being further characterized as having at least an initial state, to be occupied by said character matcher at the start of the matching procedure, and an idle state, to be occupied by said character matcher after an unsuccessful comparison between the token specified in the current state of said character matcher and the current input character; the respective states being partitioned among said character matchers to avoid any sequence of input characters requiring any character matcher to be simultaneously in more than one state; said system, for each string of input characters to be matched and a corresponding character matcher, comprising:

(a) reading means, for reading said input characters from said database;

(b) comparison means, for sequentially comparing each input character against the token associated with the current state of said character matcher;

(c) determinant means, for determining a succeeding state of said character matcher based on a successful comparison of the current input character against the token specified in said character matcher's current state; and (d) forcing means, operative for said character matcher to force other character matchers into specified states.

18. The system of claim 17 wherein the initial state and the idle state comprise a single state.

19. The system of claim 17 wherein the character matchers are disposed in a ring configuration such that said character matcher is capable of forcing only the two neighboring character matchers into a specified state.

20. The system of claim 17 wherein said database is stored in a serial access memory device.

21. The system of claim 20 wherein comparison means and determinant means are synchronized to the character delivery rate of the serial access memory device.

22. The system of claim 17 wherein determinant means comprises instructions to indicate a successful match of an element of said pattern.

23. The system of claim 22 wherein said indication of a successful match additionally includes an identifier of the specified element of said pattern.

24. The system of claim 23 wherein the elements of the pattern correspond to words and phrases, whereby the indication of a successful match signifies that a particular word or phrase occurs in a particular string of input characters.

* * * * *